United States Patent
Krishnamoorthy et al.

(10) Patent No.: US 9,119,173 B1
(45) Date of Patent: Aug. 25, 2015

(54) METHOD AND APPARATUS FOR ANTENNA SHARING FOR IDLE-IDLE COLLISION SCENARIOS IN DUAL-RADIO DEVICES

(71) Applicant: QUALCOMM Incorporated, San Diego, CA (US)

(72) Inventors: Parthasarathy Krishnamoorthy, Hyderabad (IN); Rashid Ahmed Akbar Attar, San Diego, CA (US); Ning He, San Diego, CA (US); Anand Rajurkar, Hyderabad (IN); Dhananjaya Sarma Ponukumati, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/274,312

(22) Filed: May 9, 2014

(51) Int. Cl.
| | |
|---|---|
| *H04W 72/00* | (2009.01) |
| *H04W 68/02* | (2009.01) |
| *H04W 74/08* | (2009.01) |
| *H04W 8/18* | (2009.01) |
| *H04W 88/06* | (2009.01) |

(52) U.S. Cl.
CPC .............. *H04W 68/02* (2013.01); *H04W 8/183* (2013.01); *H04W 74/085* (2013.01); *H04W 88/06* (2013.01)

(58) Field of Classification Search
CPC .... H04W 24/00; H04W 72/082; H04W 16/10
USPC .................. 455/452.1, 450, 422.1, 458, 456.4
See application file for complete search history.

(56) References Cited

U.S. PATENT DOCUMENTS

| | | | |
|---|---|---|---|
| 2010/0248768 A1* | 9/2010 | Nakatsugawa ................ | 455/509 |
| 2013/0065644 A1 | 3/2013 | Bishop et al. | |
| 2013/0189985 A1 | 7/2013 | Mutya et al. | |
| 2013/0260761 A1 | 10/2013 | Walke et al. | |
| 2014/0105447 A1* | 4/2014 | Samari et al. ................ | 382/100 |
| 2014/0315549 A1* | 10/2014 | Zhang et al. ................ | 455/434 |

FOREIGN PATENT DOCUMENTS

| | | |
|---|---|---|
| WO | WO-2012055434 A1 | 5/2012 |
| WO | WO-2013014000 A1 | 1/2013 |

* cited by examiner

*Primary Examiner* — Nghi H Ly
(74) *Attorney, Agent, or Firm* — Arent Fox LLP

(57) ABSTRACT

Methods and apparatuses for managing one or more radio resources of a multi-subscriber identity module user equipment (UE) are presented. For example, one such method presented by the disclosure may include determining that a wake-up cycle collision condition exists between a first subscription and a second subscription of the UE when the first subscription and second subscription are camped on a same cell. In addition, the example method may include receiving, via a first radio resource of the UE associated with the first subscription, a paging message during a paging block of the cell, wherein a second radio resource of the UE associated with the second subscription is unavailable. Furthermore, the example methodology may include determining, by the first subscription, that the paging message indicates that a page exists for the second subscription and informing the second subscription that the page exists.

28 Claims, 8 Drawing Sheets

METHOD AND APPARATUS FOR ANTENNA SHARING FOR IDLE-IDLE COLLISION SCENARIOS IN DUAL-RADIO DEVICES

BACKGROUND

The present disclosure relates to the field of wireless communications, and more particularly to antenna sharing in dual-radio devices.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

The following presents a simplified summary of one or more aspects of the disclosure in-order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure describes example methods and apparatuses for management of multi-SIM UEs, for example, when a radio resource of a plurality of radio resources of the UE is unavailable (e.g., due to physical obstruction by a hand or head of a user) For example, the disclosure presents an example method of managing a UE, which may include determining that a wake-up cycle collision condition exists between a first subscription and a second subscription of the UE when the first subscription and second subscription are camped on a same cell. In an additional aspect, the example method may include receiving, via a first radio resource of the UE associated with the first subscription, a paging message during a paging block of the cell, wherein a second radio resource of the UE associated with the second subscription is unavailable. Furthermore, the example method may include determining, by the first subscription, that the paging message indicates that a page exists for the second subscription and informing the second subscription that the page exists.

Additionally, the present disclosure presents an example multi-SIM UE that may include a wake-up cycle collision condition determining component configured to determine that a wake-up cycle collision condition exists between a first subscription and a second subscription of the UE when the first subscription and second subscription are camped on a same cell. In an additional aspect, the example multi-SIM UE may include a first radio resource associated with the first subscription configured to receive a paging message during a paging block of the cell, wherein a second radio resource of the UE associated with the second subscription is unavailable. Furthermore, the example multi-SIM UE of the present disclosure may include a paging message managing component configured to determine, by the first subscription, that the paging message indicates that a page exists for the second subscription and configured to inform the second subscription that the page exists.

In a further aspect, the present disclosure presents an example apparatus for mobile communication, which may include means for determining that a wake-up cycle collision condition exists between a first subscription and a second subscription of the UE when the first subscription and second subscription are camped on a same cell. In addition, the example apparatus may include means for receiving, via a first radio resource of the UE associated with the first subscription, a paging message during a paging block of the cell, wherein a second radio resource of the UE associated with the second subscription is unavailable. Likewise, the example apparatus may include means for determining, by the first subscription, that the paging message indicates that a page exists for the second subscription and means for informing the second subscription that the page exists.

Moreover, the present disclosure presents a non-transitory computer-readable medium comprising instructions, that when executed by a processor of a multi-SIM UE, cause the UE to determine that a wake-up cycle collision condition exists between a first subscription and a second subscription of the UE when the first subscription and second subscription are camped on a same cell. Likewise, the computer-readable medium may include instructions, that when executed by the processor, cause the multi-SIM UE to receive, via a first radio resource of the UE associated with the first subscription, a paging message during a paging block of the cell, wherein a second radio resource of the UE associated with the second subscription is unavailable. In addition, the computer-readable medium may include instructions, that when executed by the processor, cause the multi-SIM UE to determine, by the first subscription, that the paging message indicates that a page exists for the second subscription and inform the second subscription that the page exists.

In a further aspect, a method of managing a UE is presented by the present disclosure, and may include determining that a second radio resource associated with a second subscription is unavailable and selecting a first radio resource associated with a first subscription as a preferred radio resource for the second subscription based on determining that the second radio resource is unavailable. The example method may further include determining that a wake-up cycle collision condition exists between the first subscription and the second subscription on the first radio resource and forcing a cell reselection for one of the first subscription or the second subscription based on determining that the wake-up cycle collision condition exists.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
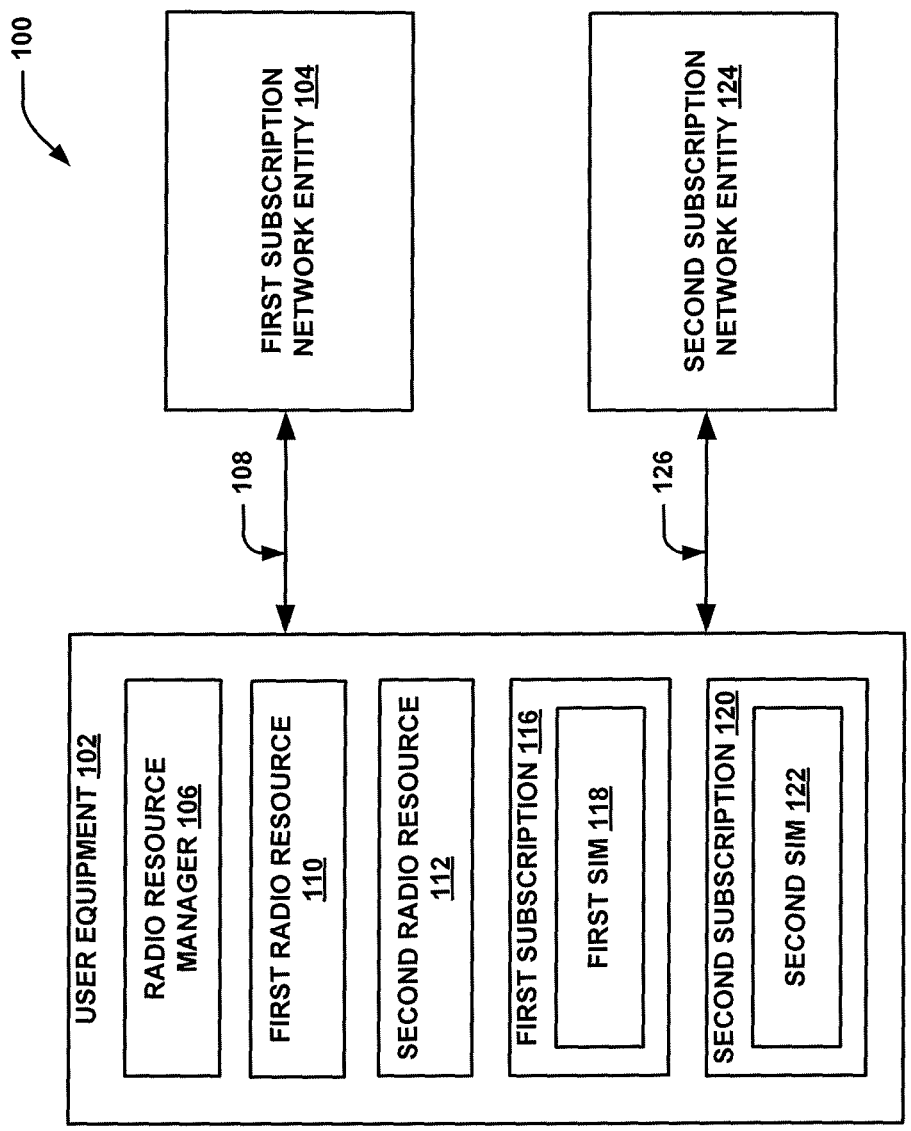
FIG. 1 is a block diagram illustrating an example wireless communications system according to the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Currently, some wireless devices are configured to facilitate communication via multiple unique subscriptions, each being associated with a Subscriber Identification Modules (SIM) of multiple SIMs present on the device. In other words, multi-SIM devices (e.g., dual-SIM, dual standby (DSDS) and dual-SIM, dual active (DSDA) devices) may include one SIM associated with a first subscription and a second SIM associated with a second subscription.

In addition, multi-SIM devices can contain a plurality of radio resources (e.g., antennas, transceivers, or the like), each of which may be configured to communicate with one or more operator networks associated with subscriptions corresponding to the multiple SIMs of the UE. Furthermore, each radio may have one or more receive and/or transmit chains, but in the most common scenario, there is only one receive and transmit chain connected to a single antenna for each radio resource.

When the antenna of one radio resource is blocked by hand, head, or some other object, the performance of the blocked radio can degrade significantly. In such cases, the radio associated with the blocked antenna may choose to switch to another, unblocked radio resource to maintain transmit/receive functionality during periodic wake-ups when each of the subscriptions are in idle mode. This can lead, however, to radio resource contention for the unblocked radio resource between the two subscriptions when individual page wake-up occurrences defined by a page wake-up cycle (or Discontinuous Reception (DRX) cycle) of each subscription collide with one other. Under current implementations, when persistent wake-up cycle collision occurs between the two subscriptions attempting to use the same radio, the device will alternate wake-ups between the first subscription and the second subscription using the same antenna.

Thus, methods and apparatuses are needed to allow for improved radio resource management to allow for improved performance of multi-SIM devices when resources of the device for use in the various subscriptions are limited.

Thus, the present disclosure presents methods and apparatuses for improved radio resource management in a multi-SIM UE where a single radio resource is available. In an aspect of the present disclosure, the multi-SIM UE may be configured to force a cell reselection of at least one subscription of a UE where the performance of a radio resource (e.g., antenna, transceiver, or the like) associated with the subscription has degraded, for example, due to blocking or obstruction of the radio resource by the head or hand of a user. In such an aspect, a first subscription associated with a first SIM and a second subscription associated with a second SIM may be associated with separate networks or may be associated with the same network but may be camped on different base stations, cells, or sectors. Each of the base stations, cells, or sectors may have unique paging broadcast cycles that define a rate and/or timing according to which the individual base stations, cells, or sectors transmit paging messages on a paging channel or paging indicator channel. In an aspect, these paging messages may indicate that a page exists for one or more UEs, SIMs, or associated subscriptions that are associated with the base station, cell, or sector. Furthermore, for purposes of the present disclosure, the term "paging message" refers to a message that serves as a paging indicator transmitted on a paging indicator channel or paging channel that indicates that a page exists (e.g., that a page is present for) a particular UE, SIM, or associated subscription. A page may exist for a particular subscription where a network associated with the subscription has received a request to initiate a voice call, application, data call, messaging session, or any other occurrence that could prompt the UE, SIM, or subscription to transition from the idle mode to receive and/or transmit information or data.

As such, UEs or subscriptions associated with SIMs of a UE may be configured to wake up from an idle mode to monitor the paging channel or paging indicator channel according to a wake-up cycle that corresponds to the paging broadcast cycle of the base station, cell, or sector upon which the UE, SIM, or associated subscription is currently camped. In an aspect, a "wake-up cycle" of the present disclosure may correspond to a DRX cycle. By aligning the wake-up cycle with the paging broadcast cycle of the base station, cell, or sector upon which the UE, SIM, or subscription is camped, paging messages may be reliably received.

Additionally, when a UE determines that a radio condition associated with one of the subscriptions has degraded below a threshold value, the UE may conclude that the radio resource associated with the subscription is blocked, for example, by a head or hand of a user. For example, when the radio resource is an antenna and the antenna is blocked by a body part of the user, the performance of the antenna may fall below the threshold value. As such, the UE may switch the preferred radio resource of the subscription to another radio resource of the UE such that pages for the subscription are not missed due to the blocked radio resource. As this other radio resource of the UE may then be responsible for receiving paging messages for multiple subscriptions of the UE based on multiple wake-up cycles, the wake-up cycles may overlap wholly or partially. Such an overlap of wake-up cycles may be referred to herein as a "wake-up cycle collision" or "wake-up cycle collision condition." Due to this wake-up cycle collision, only a subscription with a highest priority of the subscriptions using the unblocked radio resource is able to receive paging messages during the periods of wake-up cycle overlap. As such, paging messages that are transmitted by the network of the unprioritized subscription may be missed during the overlap period.

Accordingly, in an aspect of the disclosure, where a wake-up cycle collision is detected, the LIE (or a radio resource manager component therein) may be configured to force a cell reselection (e.g., to a neighbor cell) for one of the subscriptions. As each cell has a unique wake-up cycle, when the UE reselects to another cell for a subscription whose radio resource is blocked or unavailable, the wake-up cycles likewise change, and may change such that no overlap between the wake-up cycles of the first subscription and the second subscription exists after the cell reselection. This allows the unblocked radio resource (e.g., unblocked antenna) to be shared between the subscriptions without wake-up cycle collision. In an additional aspect, if the UE determines that persistent wake-up cycle collision still occurs with the newly reselected cell, the UE may further select a next neighbor cell for further reselection. Furthermore, to avoid ping-ponging between cells when the device moves between different cells by virtue of the one or more forced reselections, a restriction can be implemented such that only a maximum number (e.g., two, three, or the like) of neighbor cells will be chosen for potential reselection, and if none of these neighbor cells eliminate the persistent wake-up cycle collision condition, the concerned subscription may revert back to the original cell or the UE may revert to a legacy solution in which the wake-up cycle for different subscriptions alternate.

In addition, although the first subscription and the second subscription are often associated with separate operator networks, this is not always the case. Instead, the first subscription and the second subscription may be associated with the same operator network and may even camp on the same base station, cell, or sector. As both subscriptions are subject to the same wake-up cycle of the cell upon which both have camped, persistent wake-up collision may occur. In a further aspect of the present disclosure, because paging messages transmitted by the cell are transmitted during the same paging block regardless of the subscription, it is sufficient for only one of the subscriptions to wake up during a particular wake-up cycle to determine whether pages exist for either of the first subscription or the second subscription. Accordingly, in an aspect of the present disclosure, wake-up cycle collision may be avoided by selecting one subscription or associated SIM to wake up during a wake-up period to determine whether pages exist for either the first subscription or the second subscription.

FIG. 1 is a schematic diagram illustrating a system 100 for wireless communication, according to an example configuration. FIG. 1 includes an example first subscription network entity 104, which may communicate wirelessly with a first subscription 116 of one or more UEs 102 over one or more wireless communication channels 108, which may include, in a non-limiting aspect, data communication channels and control channels. Additionally, FIG. 1 includes an example second subscription network entity 124, which may communicate wirelessly with a second subscription 124 of one or more UEs 102 over one or more wireless communication channels 126, which may include, in a non-limiting aspect, data communication channels, paging channels, paging indicator channels, and control channels. In an aspect, communication channels 108 and 126 may comprise any over-the-air (OTA) communication channel, including, but not limited to, one or more data or control communication channels operating according to specifications promulgated by 3GPP and/or 3GPP2, which may include first generation, second generation (2G), 3G, 4G, etc. wireless network communication protocols.

UE 102 may comprise any type of mobile device, such as, but not limited to, a smartphone, cellular telephone, mobile phone, laptop computer, tablet computer, or other portable networked device. In addition, UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In general, UE 102 may be small and light enough to be considered portable and may be configured to communicate wirelessly via an over-the-air communication link using one or more OTA communication protocols described herein.

Additionally, in some examples, UE 102 may be configured to facilitate communication on two separate networks via two separate subscriptions, such as, but not limited to, a first subscription 116 and a second subscription 120. As such, UE 102 may comprise a multi-Subscriber Identity Module (SIM), mutual standby (e.g., dual SIM, dual standby (DSDS)) UE, which may include two SIM cards—a first SIM card 118 for the first subscription 116 and a second SIM card 122 for the second subscription 120. Furthermore, although only two SIMs and two subscriptions are illustrated in FIG. 1, the UE 102 may contain any number of subscriptions and related SIMs. In a non-limiting aspect, first subscription 116 may comprise a Wideband Code Division Multiple Access (WCDMA) subscription and the second subscription 120 may comprise a Global System for Mobile Communications (GSM) subscription.

Furthermore, UE 102 may include a radio resource manager 106, which may be configured to manage a plurality of radio resources of UE 102, which may include a first radio resource 110 and a second radio resource 112. In some examples, first radio resource 110 may serve as a preferred or higher priority radio resource of first subscription 116 (or first SIM 118) and second radio resource 112 may serve as a preferred radio resource of second subscription 120 (or second SIM 122). In some examples, however, first radio resource 110 and/or second radio resource 112 may be shared by first subscription 116 and second subscription 118, for example, when first radio resource 110 or second radio resource 112 are blocked by an object (e.g., a hand or head of a user) or are otherwise unavailable. Furthermore, first radio resource 110 and/or second radio resource 112 may comprise a transceiver, receiver, transmitter, antenna, and/or related circuitry for performing wireless communication with first subscription network entity 104 and/or second subscription network entity 124. In addition, radio resource manager 106 is discussed in detail below in reference to FIG. 2.

Furthermore, first subscription network entity 104 and second subscription network entity 124 of FIG. 1 may comprise one or more of any type of network module, such as an access point, a macro cell, including a base station (BS), node B, eNodeB (eNB), a relay, a peer-to-peer device, an authentication, authorization and accounting (AAA) server, a mobile switching center (MSC), a radio network controller (RNC), or a small cell. As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femtocell, a pico node, a micro node, a Node B, evolved Node B (eNB), home Node B (HNB) or home evolved Node B (HeNB). Therefore, the term "small cell," as used herein, refers to a relatively low transmit power and/or a relatively small coverage area cell as compared to a macro cell. Additionally, first subscription network entity 104 may communicate with one or more other network entities of wireless and/or core networks.

Additionally, system 100 may include any network type, such as, but not limited to, wide-area networks (WAN), wireless networks (e.g. 802.11 or cellular network), the Public Switched Telephone Network (PSTN) network, ad hoc networks, personal area networks (e.g. Bluetooth®) or other combinations or permutations of network protocols and network types. Such network(s) may include a single local area network (LAN) or wide-area network (WAN), or combinations of LANs or WANs, such as the Internet. Such networks may comprise a Wideband Code Division Multiple Access (W-CDMA) system, and may communicate with one or more UEs 102 according to this standard. As those skilled in the art will readily appreciate, various aspects described throughout this disclosure may be extended to other telecommunication systems, network architectures and communication standards. By way of example, various aspects may be extended to other Universal Mobile Telecommunications System (UMTS) systems such as Time Division Synchronous Code Division Multiple Access (TD-SCDMA), High Speed Downlink Packet Access (HSDPA), High Speed Uplink Packet Access (HSUPA), High Speed Packet Access Plus (HSPA+) and Time-Division CDMA (TD-CDMA). Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), Institute of Electrical and Electronics Engineers (IEEE) 802.11 (Wi-Fi), IEEE 802.16 (WiMAX®), IEEE 802.20, Ultra-Wideband (UWB), Bluetooth, and/or other suitable systems. The actual telecommunication standard, network architecture, and/or communication standard employed will depend on the specific application and the overall design constraints imposed on the system. The various devices coupled to the network(s) (e.g., UEs 102, first subscription network entity 104, second subscription network entity 124) may be coupled to a core network via one or more wired or wireless connections.

Figure 2:
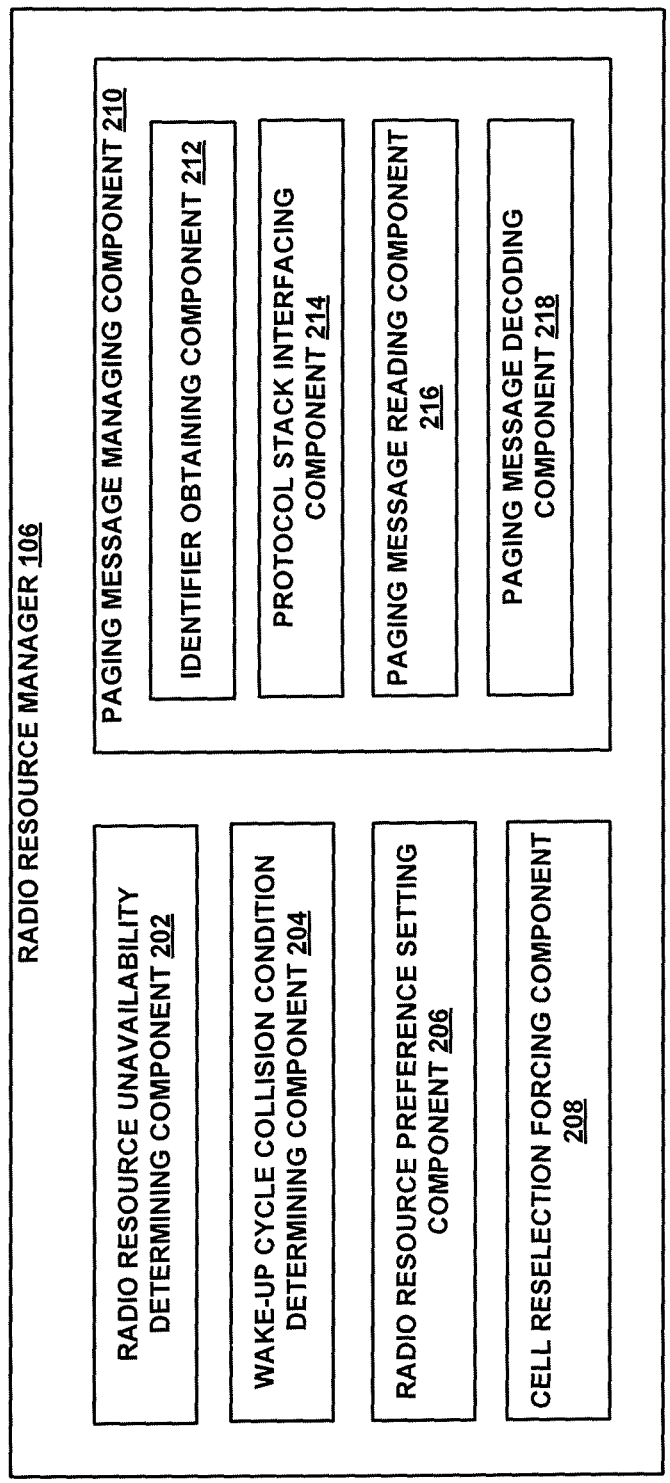
FIG. 2 is a block diagram illustrating an example radio resource manager according to an example apparatus of the present disclosure.

Turning to FIG. 2, an example radio resource manager 106 (of FIG. 1, for example) is presented as comprising a plurality of individual components for carrying out the one or more methods or processes described herein. For example, in an aspect, radio resource manager 106 may include radio resource unavailability determining component 202, which may be configured to determine whether one or more radio resources of a UE are unavailable for communication, for example, based on an object (e.g., a head or hand of a user) obstructing the radio resource. In an aspect, the radio resource unavailability determining component 202 may be configured to determine that a radio resource is unavailable by measuring a received signal power associated with the radio resource and comparing the received signal power to a threshold value. When the received signal power is below the threshold value, the radio resource unavailability determining component 202 may be configured to obtain the received signal power associated with another radio resource of the UE. Where the received signal power of the other radio resource is above the threshold value, the radio resource unavailability determining component 202 may determine that the original radio resource is blocked and is therefore unavailable for communication. Thus, for purposes of the present disclosure, a radio resource is considered "unavailable" where it is determined that the radio resource is blocked, which may occur where a received signal power of the radio resource is below a threshold and a received signal power of another radio resource of the UE is above the threshold.

In addition, radio resource manager 106 may include a wake-up cycle collision condition determining component 204, which may be configured to determine whether a wake-up cycle collision condition exists between two or more subscriptions (or SIMS) of a multi-SIM UE (e.g., UE 102). For purposes of the present disclosure, the term "wake-up cycle collision condition" may refer to a state of the multi-SIM UE where the wake-up cycles of two or more subscriptions are configured such that individual scheduled wake-up instances of the wake-up cycle partially or wholly overlap when the two or more subscriptions share a radio resource. In an aspect, wake-up cycle collision condition determining component 204 may be configured to compare the wake-up cycles of a plurality of subscriptions (or SIMs) to determine whether overlap of the wake-up instances of the wake-up cycles exists between two or more of the plurality of subscriptions.

Alternatively or additionally, wake-up cycle collision condition determining component 204 may be configured to determine that a wake-up cycle collision condition exists when two or more subscriptions of the multi-SIM UE are camped on the same base station, cell, or sector. As individual base stations, cells, or sectors may broadcast paging messages according to a unique broadcast cycle or rate, the wake-up cycles for each UE camped on the individual base stations, cells, or sectors may wake up at a rate corresponding to the broadcast cycle or rate of the base station, cell, or sector such that each of the UEs may receive the broadcast paging messages. In an aspect, this wake-up cycle or rate may comprise a discontinuous reception cycle (DRX). Thus, where a radio resource of a UE is shared between two or more subscriptions (or SIMs) the wake-up cycle collision condition determining component 204 may be configured to determine that a wake-up cycle collision condition exists because each of the two or more subscriptions sharing the radio resource cannot have simultaneous priority to use the radio resource during the wake-up cycle.

In addition, radio resource manager 106 may include a radio resource preference setting component 206, which may be configured to set and/or store a preferred radio resource (e.g., prioritized) for each subscription of the multi-SIM UE. For example, in an aspect, radio resource preference setting component 206 may be configured to set a preferred radio resource of a first subscription to a first radio resource and to set a preferred radio resource of a second subscription to a second radio resource. Where, however, radio resource unavailability component 202 determines that one of the radio resources is unavailable (e.g., due to an object blocking the radio resource), radio resource preference setting component 204 may set the preferred radio resource for any subscriptions using the unavailable radio resource to another radio resource of the UE. For example, in the aspect above, where the first radio resource is determined to be unavailable, the radio resource preference setting component 206 may be configured to set the preferred radio resource of the first subscription to the second radio resource.

In addition, radio resource manager 106 may include a cell reselection forcing component 208, which may be configured to perform forced reselection of a base station, cell, or sector associated with a subscription of the multi-SIM UE, for example, where wake-up cycle collision condition determining component 204 determines that a wake-up cycle collision condition exists for a radio resource. In an aspect, cell reselection forcing component 208 may be configured to measure received signal power associated with one or more neighbor cells and compare each of the received signal powers with a threshold value to determine a set of neighbor cell reselection candidates that have a cell strength sufficient to ensure paging message receive and decode success after cell reselection. In some examples, the threshold value may be about −80 dBm, but may comprise any threshold value selected by a manufacturer, network operator, or user. Thereafter, the cell reselection forcing component 208 may rank the neighbor cells of the set of neighbor reselection candidates (e.g., based on received signal power), select a target neighbor cell for reselection, and initiate a cell reselection procedure. As such, once the reselection has completed, the new cell upon which the subscription is camped may have a wake-up cycle that does not present a wake-up cycle collision condition for the radio resource and thus may increase the probability of proper paging message reception for both subscriptions that share the radio resource.

In an additional aspect, cell reselection forcing component 208 may be configured to perform additional reselection procedures if, after an initial cell reselection, a wake-up cycle collision condition persists for the shared radio resource. However, to avoid a ping-pong scenario between cells that have wake-up cycles that cause wake-up cycle collision, cell reselection forcing component 208 may be configured to implement a restriction on a number of cells in a set of neighbor cells that may be chosen for reselection. As a result, if prior reselections to the cells in the set of neighbor cells fail to cure the wake-up cycle collision condition, the concerned subscription may reselect to its original cell for page monitoring according to a legacy algorithm, such as alternating page monitoring instances between subscriptions sharing a radio resource. In an aspect, the number of cells of the set of neighbor cells that may be chosen for reselection may comprise two cells, three cells, or any number of cells, and may be selected by a user, manufacturer, or network operator.

In an additional aspect, radio resource manager 106 may include a paging message managing component 210, which may be configured to manage paging message reception and related functions for a multi-SIM UE. For example, paging message managing component 210 may be configured to tune a radio resource of the UE to a paging channel or paging indicator channel associated with one or more cells upon which the subscriptions of the UE are camped during a paging block of the cell and according to a wake-up cycle associated with the cell. Upon tuning the radio resource, the paging message managing component 210 may determine whether a paging message was received by the radio resource during a paging block for any of a plurality of subscriptions sharing the radio resource for page reception purposes. In an aspect, the paging message managing component 210 may be configured to determine whether a paging message (or paging indicator message) indicates that a page exists for any subscription that may be using the radio resource as its preferred radio resource. For example, where a first and second subscription are sharing a first radio resource of the UE because a second radio resource initially associated with the second subscription is unavailable, the first subscription may be activated, powered up, or may otherwise wake up according to the wake-up cycle of the cell to check the cell for potential pages for either the first subscription or the second subscription. As such, in an aspect of the present disclosure, the second subscription need not wake up according to the wake-up cycle to monitor a paging channel for paging messages, as the first subscription may wake up and monitor the paging channel for pages for both the first subscription and the second subscription. As such, where the paging message managing component 210 determines that a page exists for the second subscription, it may inform the second subscription that the page exists.

In addition, paging message managing component 210 may include an identifier obtaining component 212, which may be configured to obtain an identifier of one or more SIMs associated with the one or more subscriptions of a multi-SIM device. When paging messages or paging indicator messages are broadcast by a cell, an identifier associated with the page is appended to the message to indicate for which SIM or subscription the page is intended. As such, in order to determine which SIM or subscription a page is for, the paging message managing component 210 obtains the identifier associated with the SIMs or subscriptions using a shared radio resource. As such, where a first subscription is configured to wake up according to a wake-up cycle to determine whether a page exists for the first subscription or the second subscription, the identifier of the second subscription may first be obtained by the first subscription to determine whether a page exists for the second subscription.

In an aspect, the identifier may include an International Mobile Subscriber Identity (IMSI), Temporary Mobile Subscriber Identity (TMSI), or any other identifier known in the art. In general, a page is identified with the help of such IMSI or TMSI information, which is unique to each SIM of the multi-SIM UE. The identifier of each SIM may be updated either by the network or the SIM itself to the upper layers of the UE protocol stack. As the upper layers interact with lower layers of the UE protocol stack, each SIM identifier is communicated to the lower layers by the upper layers and is therefore known by the lower layers, as well. As such, paging message managing component 210 may include a protocol stack interfacing component 214, which may be configured to communicate one or more identifiers of the plurality of SIMs of the multi-SIM UE to identifier obtaining component 212 and route any page indications or paging messages to a destination SIM or subscription by inter-layer (upper layer/lower layer) communication. In other words, protocol stack interfacing component 214 may be configured to inform one or more upper layers of a protocol stack of the multi-SIM UE that a page exists for a particular subscription of the UE (e.g., a first or second subscription), where the upper layers indicate to one or more lower layers of the protocol stack associated with the particular subscription that a page exists for that subscription.

Furthermore, paging message managing component 210 may include a paging message reading component 216, which may be configured to read one or more paging messages of a paging block received at the radio resource. In an aspect, reading a paging message may include analyzing a received paging message to determine a subscription (or SIM) to which the page corresponds. For example, in an aspect, the paging message reading component 216 may be configured to determine that a destination SIM identifier of the paging message corresponds to the identifier associated with the SIM corresponding to the second subscription. In addition, paging message managing component 210 may include a paging message decoding component 218, which may be configured to decode a received paging message to obtain information about the page for the second subscription.

Through exemplary components 202, 204, 206, 208, 210, 212, 214, 216, and 218 are presented in reference to radio resource manager 106, they are not exclusive. Instead, radio resource manager 106 may include additional or alternative components configured to perform aspects of the present disclosure and the claims recited below.

Figure 3:
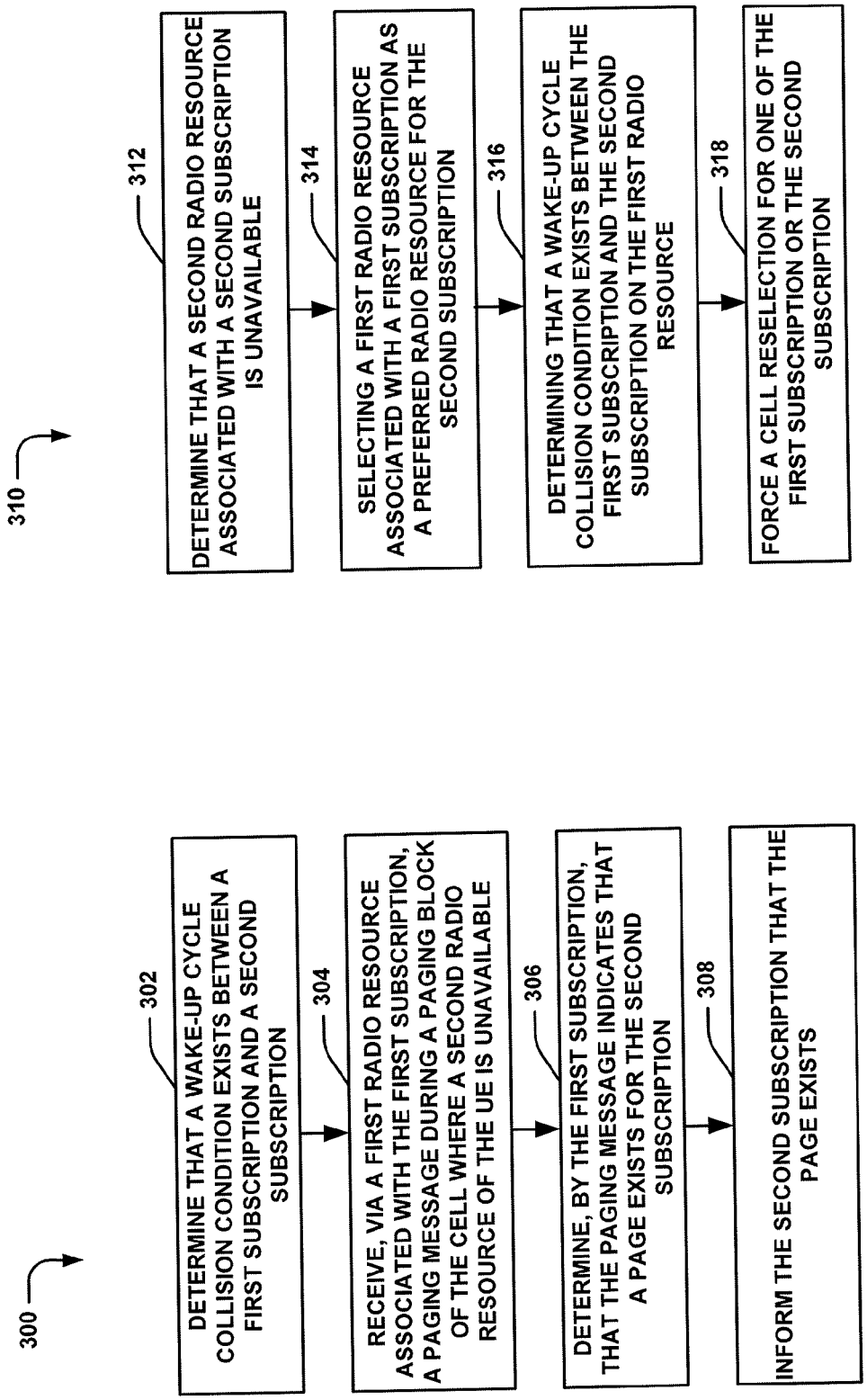
FIG. 3A is a flow diagram comprising a plurality of functional blocks representing an example methodology of the present disclosure.
FIG. 3B is a flow diagram comprising a plurality of functional blocks representing an additional example methodology of the present disclosure.

FIG. 3A presents an exemplary methodology 300 comprising a non-limiting set of steps represented as blocks that may be performed by an apparatus described herein (e.g. user equipment 102 of FIG. 1, radio resource manager 106 of FIGS. 1 and 2). In an aspect, methodology 300 may comprise a method of radio resource management in a multi-SIM user equipment, and may include, at block 302, determining (e.g., wake-up cycle collision condition determining component 204 of FIG. 2) that a wake-up cycle collision condition exists between a first subscription and a second subscription of a multi-SIM UE, for example, where the first subscription and second subscription share a radio resource due to a second radio resource of the UE being unavailable. In an aspect, it may be determined that a wake-up cycle collision condition exists based on the first subscription and the second subscription being camped on a same cell, base station, or sector, and thus having a same wake-up cycle.

Additionally, methodology 300 may include, at block 304, receiving, via a first radio resource (e.g., first radio resource 110 of FIG. 1), a paging message during a paging block of the cell where a second radio resource is unavailable. In such an aspect, a first subscription may exclusively wake up to monitor a paging channel for paging messages and receive the paging messages for any subscription of the UE camped on the cell, including a second subscription.

Furthermore, methodology 300 may include, at block 306, determining (e.g., via paging message managing component 210 of FIG. 2) that the paging message indicates that a page exists for the second subscription.

In addition, methodology 300 may include, at block 308, informing (e.g., by paging message managing component 210 of FIG. 2) the second subscription that the page exists. In an aspect, informing the second subscription that the page exists may include indicating to the second subscription that the page exists for the second subscription or otherwise conveying that the page exists. For example, informing the second subscription that the page exists may include including a bit in a message to the second subscription, wherein the value of the bit (1 or 0) indicates whether a page exists for the second subscription.

Furthermore, though not shown, methodology 300 may include further example aspects. For example, methodology 300 may include obtaining (e.g., via identifier obtaining component 212 of FIG. 2) an identifier associated with a SIM corresponding to the second subscription and determining (e.g., via paging message managing component 210) that a destination SIM identifier of the paging message corresponds to the identifier associated with the SIM corresponding to the second subscription. In an aspect, such an identifier may include a Temporary Mobile Subscriber Identity or an International Mobile Subscriber Identity. Furthermore, methodology 300 may include informing (e.g., by protocol stack interfacing component 214 of FIG. 2) one or more upper layers of a protocol stack of the UE that the page exists for the second subscription, wherein the upper layers are configured to indicate to one or more lower layers of the protocol stack associated with the second subscription that the page exists for the second subscription.

FIG. 3B presents an additional exemplary methodology 310 comprising a non-limiting set of steps represented as blocks that may be performed by an apparatus described herein (e.g. user equipment 102 of FIG. 1, radio resource manager 106 of FIGS. 1 and 2). In an aspect, methodology 310 may comprise a method of radio resource management in a multi-SIM user equipment, and may include, at block 312, determining (e.g., via radio resource unavailability determining component 202 of FIG. 2) that a second radio resource associated with a second subscription is unavailable.

In addition, methodology 310 may include, at block 314, selecting (e.g., via radio resource preference setting component 206) a first radio resource associated with a first subscription as a preferred radio resource for the second subscription based on determining that the second radio resource is unavailable.

Furthermore, methodology 310 may include, at block 316, determining (e.g., via wake-up cycle collision condition determining component 204) that a wake-up cycle collision condition exists between the first subscription and the second subscription on the first radio resource.

Moreover, methodology 310 may include, at block 318, forcing (e.g., via cell reselection forcing component 208) a cell reselection for one of the first subscription or the second subscription based on determining that the wake-up cycle collision condition exists.

Furthermore, though not shown, methodology 310 may include further example aspects. For example, methodology 310 may include measuring (e.g., by cell reselection forcing component 208 of FIG. 2) a received signal power associated with one or more neighbor cells and comparing each of the received signal powers with a threshold value to determine a set of neighbor cell reselection candidates that have a cell strength sufficient to ensure page receive and decode success after cell reselection. In addition, methodology 310 may include several more aspects that may be performed by cell reselection forcing component 208 of FIG. 2, including ranking the neighbor cells of the set of neighbor reselection candidates (e.g., based on received signal power), selecting a target neighbor cell for reselection, and initiating a cell reselection procedure.

In an additional aspect, methodology 310 may include restricting on a number of cells that may be chosen for reselection but fail to cure the wake-up cycle collision condition before the concerned subscription reselects to its original cell. In an aspect, the number of cells that may be chosen for reselection according to methodology 310 may comprise two cells, three cells, or any number of cells, and may be selected by a user, manufacturer, or network operator.

Figure 4:
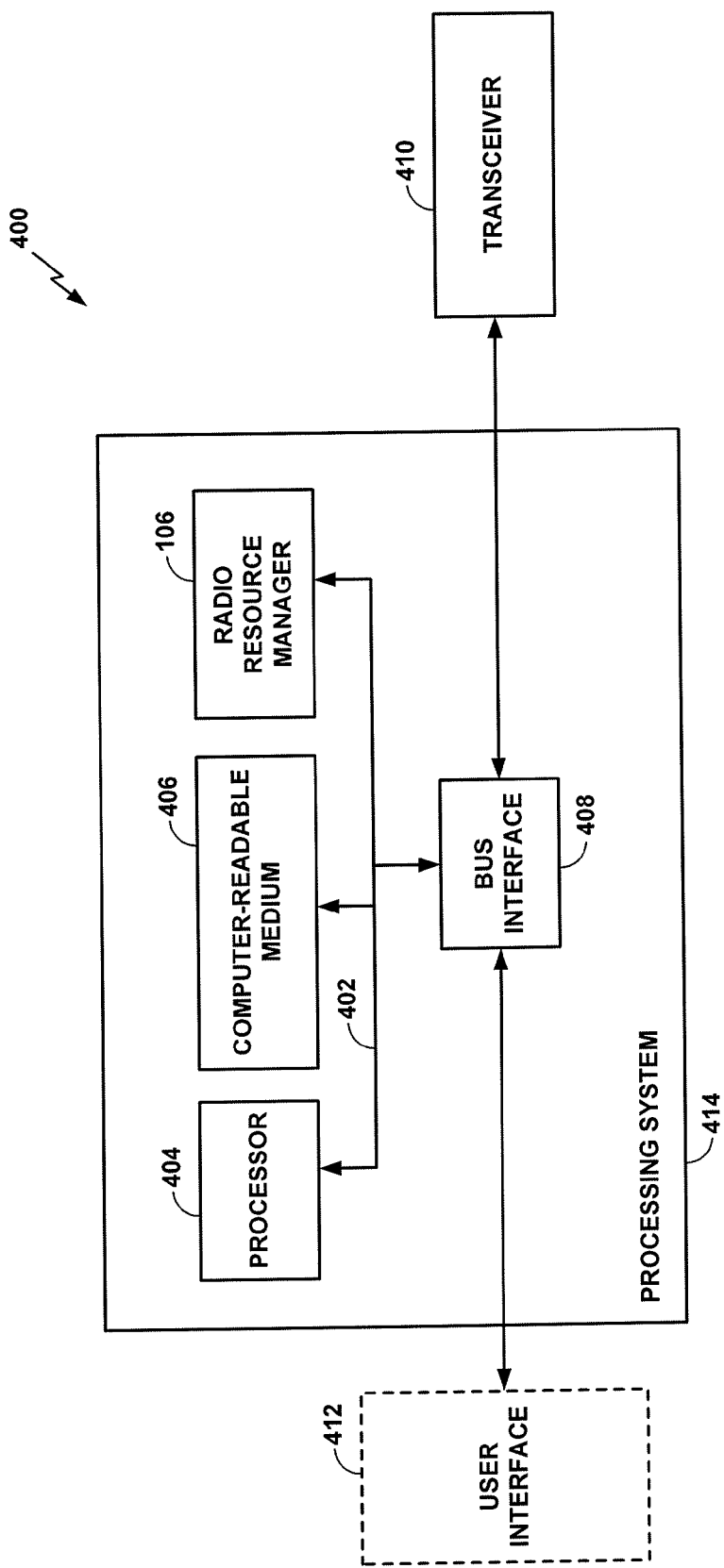
FIG. 4 is a diagram illustrating an example of a hardware implementation for an apparatus employing a processing system.

FIG. 4 is a conceptual diagram illustrating an example of a hardware implementation for an apparatus 400 employing a processing system 414. In some examples, the processing system 414 may comprise a UE or a component of a UE (e.g., UE 102 of FIG. 1). In this example, the processing system 414 may be implemented with a bus architecture, represented generally by the bus 402. The bus 402 may include any number of interconnecting buses and bridges depending on the specific application of the processing system 414 and the overall design constraints. The bus 402 links together various circuits including one or more processors, represented generally by the processor 404, computer-readable media, represented generally by the computer-readable medium 406, and an radio resource manager 106 (see FIGS. 1 and 2), which may be configured to carry out one or more methods or procedures described herein.

The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a means for communicating with various other apparatus over a transmission medium. Depending upon the nature of the apparatus, a user interface 412 (e.g., keypad, display, speaker, microphone, joystick) may also be provided.

The processor 404 is responsible for managing the bus 402 and general processing, including the execution of software stored on the computer-readable medium 406. The software, when executed by the processor 404, causes the processing system 414 to perform the various functions described infra for any particular apparatus. The computer-readable medium 406 may also be used for storing data that is manipulated by the processor 404 when executing software. For example, in an aspect, the radio resource manager 106, the components of FIG. 2 associated with the radio resource manager 106, or functionality associated with radio resource manager 106 may be implemented by the processor 404 and the computer-readable medium 406, for example, as software, hardware, or a combination of software and hardware.

Figure 5:
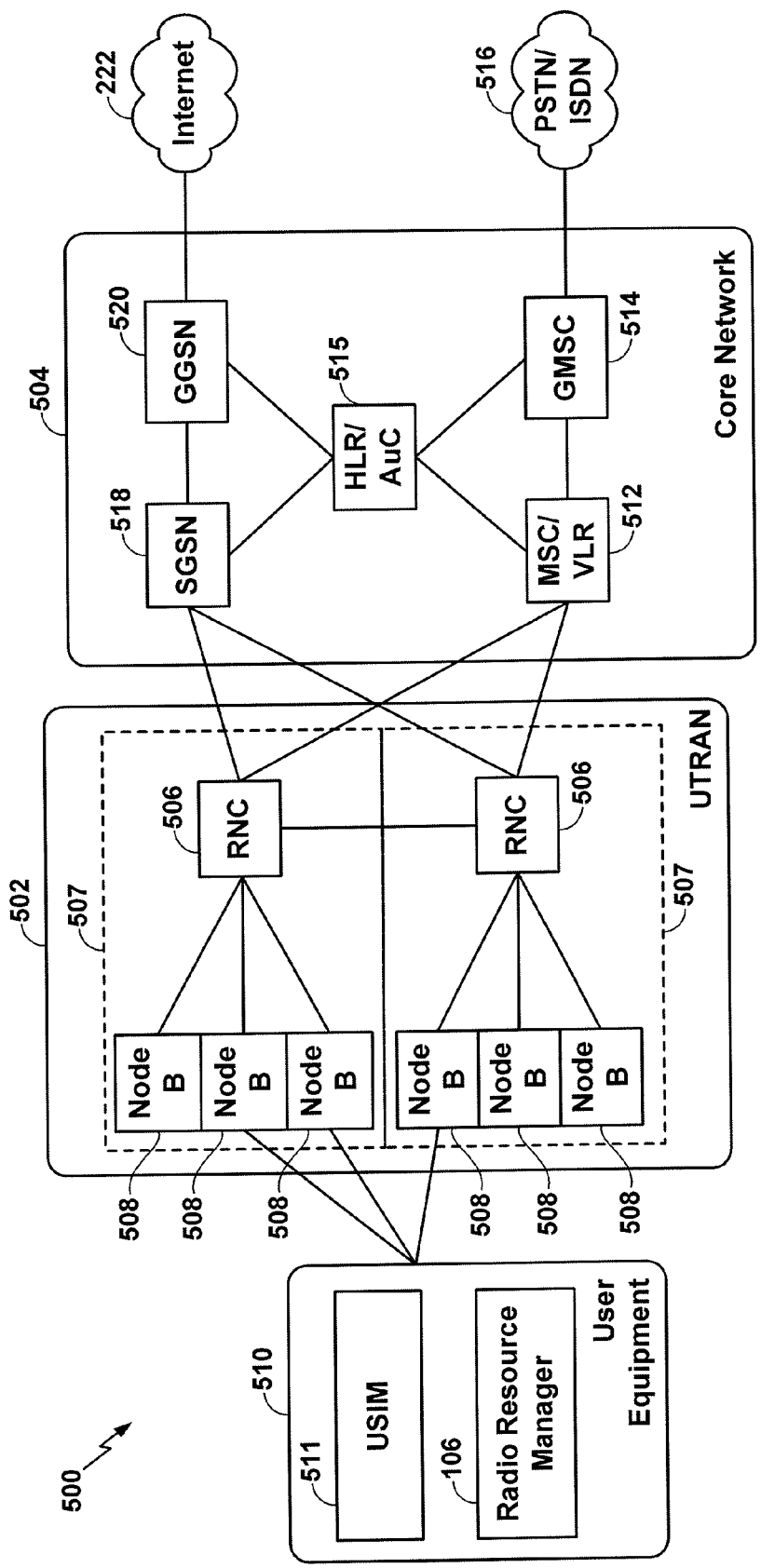
FIG. 5 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 5 are presented with reference to a UMTS system 500 employing a W-CDMA air interface. A UMTS network includes three interacting domains: a Core Network (CN) 504, a UMTS Terrestrial Radio Access Network (UTRAN) 502, and User Equipment (UE) 102. In this example, the UTRAN 502 provides various wireless services including telephony, video, data, messaging, broadcasts, and/or other services. The UTRAN 502 may include a plurality of Radio Network Subsystems (RNSs) such as an RNS 507, each controlled by a respective Radio Network Controller (RNC) such as an RNC 506. Here, the UTRAN 502 may include any number of RNCs 506 and RNSs 507 in addition to the RNCs 506 and RNSs 507 illustrated herein. The RNC 506 is an apparatus responsible for, among other things, assigning, reconfiguring and releasing radio resources within the RNS 507. The RNC 506 may be interconnected to other RNCs (not shown) in the UTRAN 502 through various types of interfaces such as a direct physical connection, a virtual network, or the like, using any suitable transport network.

Communication between a UE 102 and a Node B 508 may be considered as including a physical (PHY) layer and a medium access control (MAC) layer. Further, communication between a UE 102 and an RNC 506 by way of a respective Node B 508 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in Radio Resource Control (RRC) Protocol Specification, 3GPP TS 25.331 v9.1.0, incorporated herein by reference.

The geographic region covered by the SRNS 507 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 508 are shown in each SRNS 507; however, the SRNSs 507 may include any number of wireless Node Bs. The Node Bs 508 provide wireless access points to a core network (CN) 504 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 102 may further include a universal subscriber identity module (USIM) 511, which contains a user's subscription information to a network. In an aspect, UE 102 may include a radio resource manager 106 as described in relation to FIGS. 1 and 2, above. For illustrative purposes, one UE 102 is shown in communication with a number of the Node Bs 508. The downlink (DL), also called the forward link, refers to the communication link from a Node B 508 to a UE 102, and the uplink (UL), also called the reverse link, refers to the communication link from a UE 102 to a Node B 508.

The core network 504 interfaces with one or more access networks, such as the UTRAN 502. As shown, the core network 504 is a GSM core network. However, as those skilled in the art will recognize, the various concepts presented throughout this disclosure may be implemented in a RAN, or other suitable access network, to provide UEs with access to types of core networks other than GSM networks.

The core network 504 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 504 supports circuit-switched services with a MSC 512 and a GMSC 514. In some applications, the GMSC 514 may be referred to as a media gateway (MGW). One or more RNCs, such as the RNC 506, may be connected to the MSC 512. The MSC 512 is an apparatus that controls call setup, call routing, and UE mobility functions. The MSC 512 also includes a visitor location register (VLR) that contains subscriber-related information for the duration that a UE is in the coverage area of the MSC 512. The GMSC 514 provides a gateway through the MSC 512 for the UE to access a circuit-switched network 516. The core network 504 includes a home location register (HLR) 515 containing subscriber data, such as the data reflecting the details of the services to which a particular user has subscribed. The HLR is also associated with an authentication center (AuC) that contains subscriber-specific authentication data. When a call is received for a particular UE, the GMSC 514 queries the HLR 515 to determine the UE's location and forwards the call to the particular MSC serving that location.

The core network 504 also supports packet-data services with a serving GPRS support node (SGSN) 518 and a gateway GPRS support node (GGSN) 520. GPRS, which stands for General Packet Radio Service, is designed to provide packet-data services at speeds higher than those available with standard circuit-switched data services. The GGSN 520 provides a connection for the UTRAN 502 to a packet-based network 522. The packet-based network 522 may be the Internet, a private data network, or some other suitable packet-based network. The primary function of the GGSN 520 is to provide the UEs 510 with packet-based network connectivity. Data packets may be transferred between the GGSN 520 and the UEs 510 through the SGSN 518, which performs primarily the same functions in the packet-based domain as the MSC 512 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a Node B 508 and a UE 102. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

Figure 6:
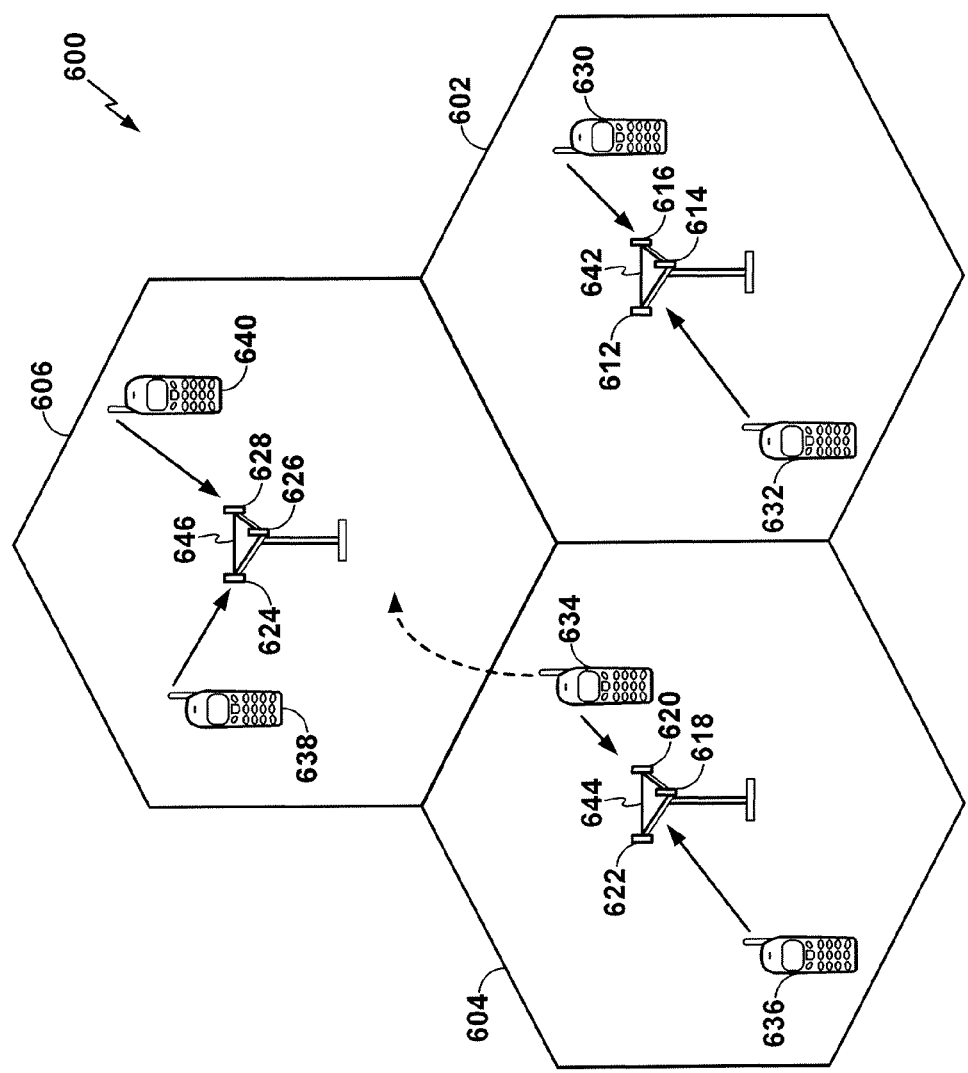
FIG. 6 is a conceptual diagram illustrating an example of an access network.

Referring to FIG. 6, an access network 600 in a UTRAN architecture is illustrated. In an example aspect, the UTRAN architecture may be associated with a network of a primary and/or secondary subscription of UE 102 where UE 102 comprises a multi-SIM device. The multiple access wireless communication system includes multiple cellular regions (cells), including cells 602, 604, and 606, each of which may include one or more sectors. The multiple sectors can be formed by groups of antennas with each antenna responsible for communication with UEs in a portion of the cell. For example, in cell 602, antenna groups 612, 614, and 616 may each correspond to a different sector. In cell 604, antenna groups 618, 620, and 622 each correspond to a different sector. In cell 606, antenna groups 624, 626, and 628 each correspond to a different sector. The cells 602, 604 and 606 may include several wireless communication devices, e.g., User Equipment or UEs, which may be in communication with one or more sectors of each cell 602, 604 or 606. For example, UEs 630 and 632 may be in communication with Node B 642, UEs 634 and 636 may be in communication with Node B 644, and UEs 638 and 640 (which may represent UE 102 of FIG. 1) can be in communication with Node B 646. Here, each Node B 642, 644, 646 is configured to provide an access point to a core network 204 (see FIG. 2) for all the UEs 630, 632, 634, 636, 638, 640 in the respective cells 602, 604, and 606. In an aspect, each of the UEs presented in FIG. 6 may comprise UE 102 of FIG. 1 and may include a radio resource manager 106 of FIGS. 1 and 2.

As the UE 634 moves from the illustrated location in cell 604 into cell 606, a serving cell change (SCC) or handover may occur in which communication with the UE 634 transitions from the cell 604, which may be referred to as the source cell, to cell 606, which may be referred to as the target cell. Management of the handover procedure may take place at the UE 634, at the Node Bs corresponding to the respective cells, at a radio network controller 506 (see FIG. 5), or at another suitable node in the wireless network. For example, during a call with the source cell 604, or at any other time, the UE 634 may monitor various parameters of the source cell 604 as well as various parameters of neighboring cells such as cells 606 and 602. Further, depending on the quality of these parameters, the UE 634 may maintain communication with one or more of the neighboring cells. During this time, the UE 634 may maintain an Active Set, that is, a list of cells that the UE 634 is simultaneously connected to (i.e., the UTRA cells that are currently assigning a downlink dedicated physical channel DPCH or fractional downlink dedicated physical channel F-DPCH to the UE 634 may constitute the Active Set).

The modulation and multiple access scheme employed by the access network 600 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 6rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 6GPP organization. CDMA2000 and UMB are described in documents from the 6GPP2 organization. The actual wireless communication standard and the multiple access technology employed will depend on the specific application and the overall design constraints imposed on the system.

Figure 7:
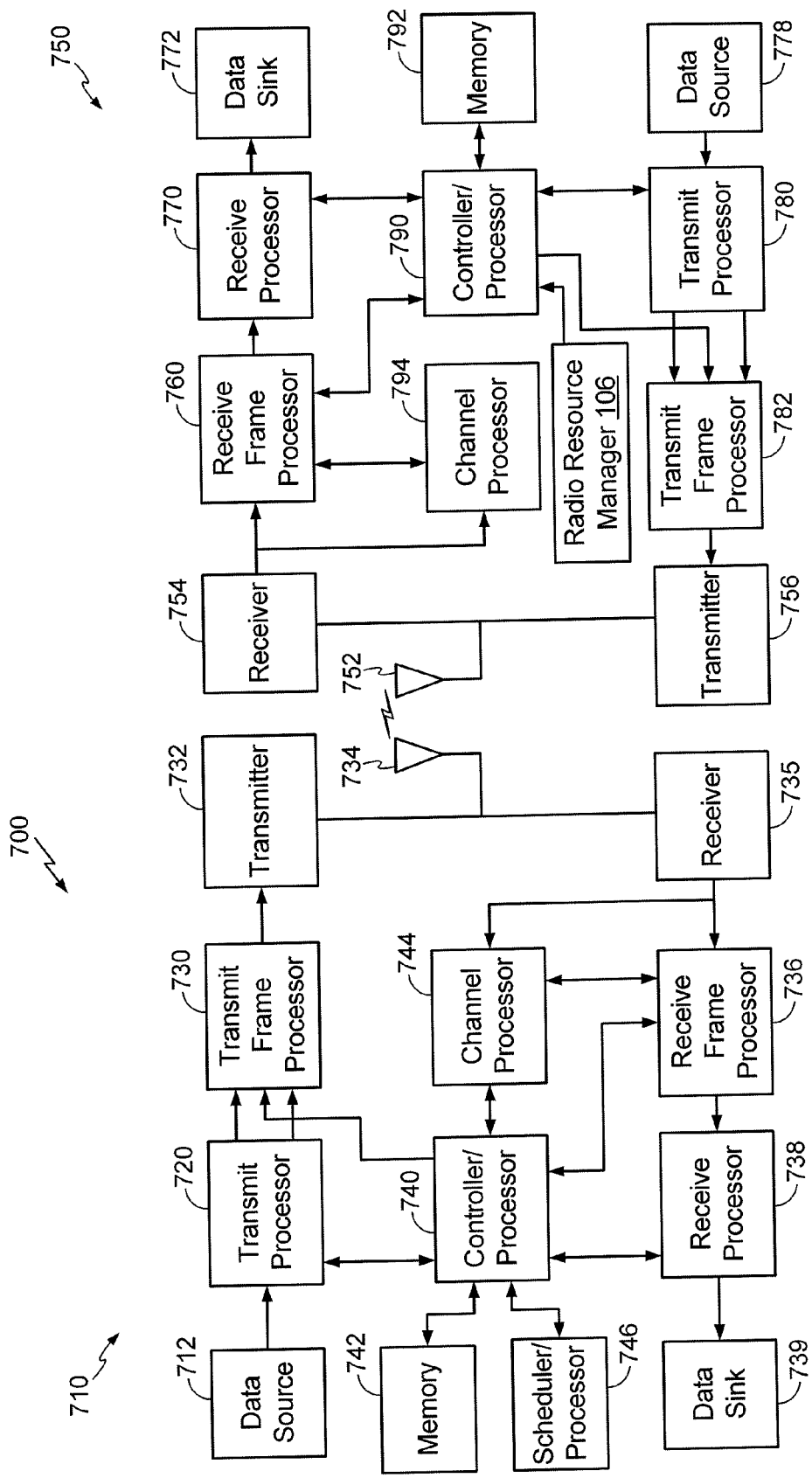
FIG. 7 is a block diagram conceptually illustrating an example of a Node B in communication with a UE in a telecommunications system.

FIG. 7 is a block diagram of a Node B 710 in communication with a UE 102, where the Node B 710 may be the first subscription network entity 104 in FIG. 1, and the UE 102 may be the UE 102 of FIG. 1. For example, UE 102 may include radio resource manager 106 and may be configured to perform the functions associated with radio resource manager 106 presented throughout the present disclosure. In the downlink communication, a transmit processor 720 may receive data from a data source 712 and control signals from a controller/processor 740. The transmit processor 720 provides various signal processing functions for the data and control signals, as well as reference signals (e.g., pilot signals). For example, the transmit processor 720 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 744 may be used by a controller/processor 740 to determine the coding, modulation, spreading, and/or scrambling schemes for the transmit processor 720. These channel estimates may be derived from a reference signal transmitted by the UE 102 or from feedback from the UE 102. The symbols generated by the transmit processor 720 are provided to a transmit frame processor 730 to create a frame structure. The transmit frame processor 730 creates this frame structure by multiplexing the symbols with information from the controller/processor 740, resulting in a series of frames. The frames are then provided to a transmitter 732, which provides various signal conditioning functions including amplifying, filtering, and modulating the frames onto a carrier for downlink transmission over the wireless medium through antenna 734. The antenna 734 may include one or more antennas, for example, including beam steering bidirectional adaptive antenna arrays or other similar beam technologies.

At the UE 102, a receiver 754 receives the downlink transmission through an antenna 752 and processes the transmission to recover the information modulated onto the carrier. The information recovered by the receiver 754 is provided to a receive frame processor 760, which parses each frame, and provides information from the frames to a channel processor 794 and the data, control, and reference signals to a receive processor 770. The receive processor 770 then performs the inverse of the processing performed by the transmit processor 720 in the Node B 710. More specifically, the receive processor 770 descrambles and despreads the symbols, and then determines the most likely signal constellation points transmitted by the Node B 710 based on the modulation scheme. These soft decisions may be based on channel estimates computed by the channel processor 794. The soft decisions are then decoded and deinterleaved to recover the data, control, and reference signals. The CRC codes are then checked to determine whether the frames were successfully decoded. The data carried by the successfully decoded frames will then be provided to a data sink 772, which represents applications running in the UE 102 and/or various user interfaces (e.g., display). Control signals carried by successfully decoded frames will be provided to a controller/processor 790. When frames are unsuccessfully decoded by the receiver processor 770, the controller/processor 790 may also use an acknowledgement (ACK) and/or negative acknowledgement (NACK) protocol to support retransmission requests for those frames.

In the uplink, data from a data source 778 and control signals from the controller/processor 790 are provided to a transmit processor 780. The data source 778 may represent applications running in the UE 102 and various user interfaces (e.g., keyboard). Similar to the functionality described in connection with the downlink transmission by the Node B 710, the transmit processor 780 provides various signal processing functions including CRC codes, coding and interleaving to facilitate FEC, mapping to signal constellations, spreading with OVSFs, and scrambling to produce a series of symbols. Channel estimates, derived by the channel processor 794 from a reference signal transmitted by the Node B 710 or from feedback contained in the midamble transmitted by the Node B 710, may be used to select the appropriate coding, modulation, spreading, and/or scrambling schemes. The symbols produced by the transmit processor 780 will be provided to a transmit frame processor 782 to create a frame structure. The transmit frame processor 782 creates this frame structure by multiplexing the symbols with information from the controller/processor 790, resulting in a series of frames. The frames are then provided to a transmitter 756, which provides various signal conditioning functions including amplification, filtering, and modulating the frames onto a carrier for uplink transmission over the wireless medium through the antenna 752.

The uplink transmission is processed at the Node B 710 in a manner similar to that described in connection with the receiver function at the UE 102. A receiver 735 receives the uplink transmission through the antenna 734 and processes the transmission to recover the information modulated onto the carrier. The information recovered by the receiver 735 is provided to a receive frame processor 736, which parses each frame, and provides information from the frames to the channel processor 744 and the data, control, and reference signals to a receive processor 738. The receive processor 738 performs the inverse of the processing performed by the transmit processor 780 in the UE 102. The data and control signals carried by the successfully decoded frames may then be provided to a data sink 739 and the controller/processor, respectively. If some of the frames were unsuccessfully decoded by the receive processor, the controller/processor 740 may also use an acknowledgement (ACK) and/or negative acknowledgement (NACK) protocol to support retransmission requests for those frames.

The controller/processors 740 and 790 may be used to direct the operation at the Node B 710 and the UE 102, respectively. For example, the controller/processors 740 and 790 may provide various functions including timing, peripheral interfaces, voltage regulation, power management, and other control functions. The computer readable media of memories 742 and 792 may store data and software for the Node B 710 and the UE 102, respectively. A scheduler/processor 746 at the Node B 710 may be used to allocate resources to the UEs and schedule downlink and/or uplink transmissions for the UEs.

Figure 8:
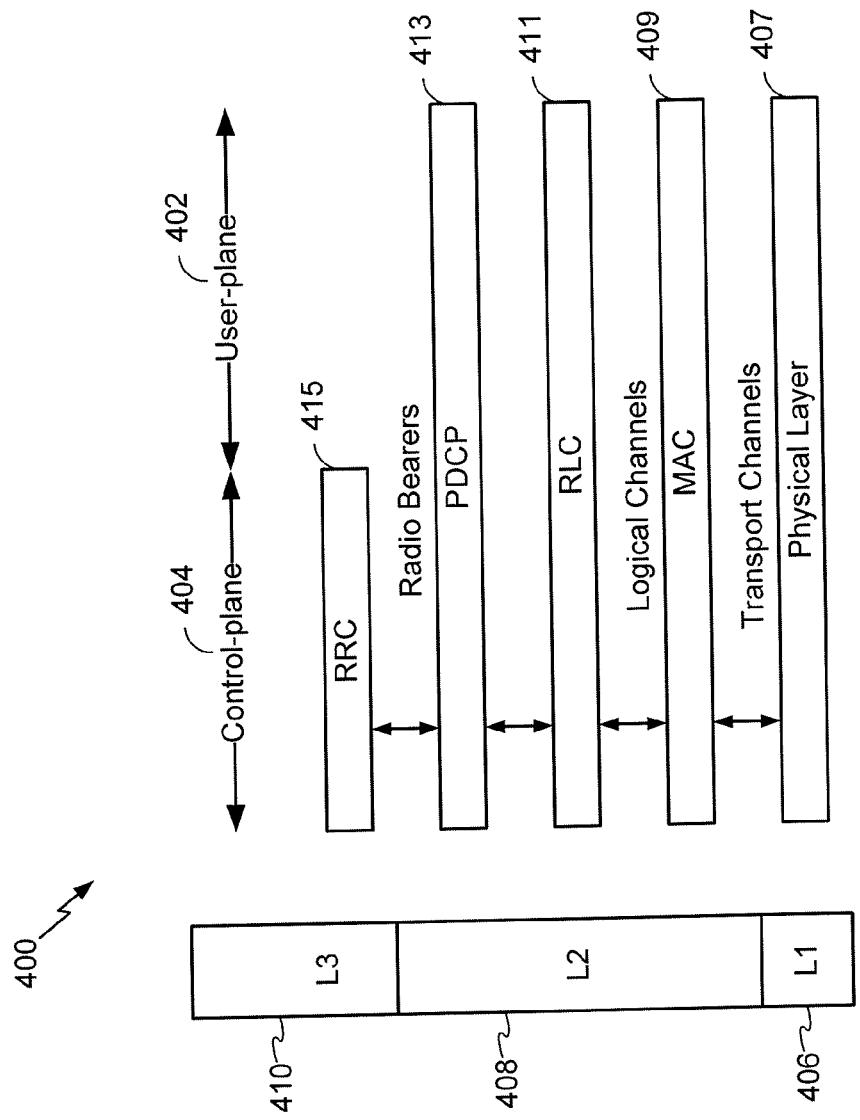
FIG. 8 is a conceptual diagram illustrating an example of a radio protocol architecture or protocol stack for the user and control plane.

Referring to FIG. 8 an example radio protocol architecture 800, or protocol stack, relates to the user plane 802 and the control plane 804 of a UE or network entity. For example, architecture 800 may be included in a UE such as UE 102 of FIG. 1. The radio protocol architecture 800 for the UE and node B is shown with three layers: Layer 1 806, Layer 2 808, and Layer 3 810. Layer 1 806 is the lowest lower and implements various physical layer signal processing functions. As such, Layer 1 806 includes the physical layer 807. Layer 2 (L2 layer) 808 is above the physical layer 807 and is responsible for the link between the UE and node B over the physical layer 807. Layer 3 (L3 layer) 810 includes a radio resource control (RRC) sublayer 815. The RRC sublayer 815 handles the control plane signaling of Layer 3 between the UE and the UTRAN. In an aspect of the present disclosure, Layer 2 and/or Layer 3 (or any further layers above the Layer 2 layer may be referred to as upper layers. Likewise, Layer 1 and/or Layer 2 may be referred to herein as lower layers In the user plane, the L2 layer 808 includes a media access control (MAC) sublayer 809, a radio link control (RLC) sublayer 811, and a packet data convergence protocol (PDCP) 813 sublayer, which are terminated at the node B on the network side. Although not shown, the UE may have several upper layers above the L2 layer 808 including a network layer (e.g., IP layer) that is terminated at a PDN gateway on the network side, and an application layer that is terminated at the other end of the connection (e.g., far end UE, server, etc.).

The PDCP sublayer 813 provides multiplexing between different radio bearers and logical channels. The PDCP sublayer 813 also provides header compression for upper layer data packets to reduce radio transmission overhead, security by ciphering the data packets, and handover support for UEs between node Bs. The RLC sublayer 811 provides segmentation and reassembly of upper layer data packets, retransmission of lost data packets, and reordering of data packets to compensate for out-of-order reception due to hybrid automatic repeat request (HARQ). The MAC sublayer 809 provides multiplexing between logical and transport channels. The MAC sublayer 809 is also responsible for allocating the various radio resources (e.g., resource blocks) in one cell among the UEs. The MAC sublayer 809 is also responsible for HARQ operations.

Several aspects of a telecommunications system have been presented with reference to an HSPA system. As those skilled in the art will readily appreciate, various aspects described throughout this disclosure may be extended to other telecommunication systems, network architectures and communication standards.

By way of example, various aspects may be extended to other UMTS systems such as W-CDMA, TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods or methodologies disclosed is an illustration of exemplary processes. Based upon design preferences, it is understood that the specific order or hierarchy of steps in the methods or methodologies described herein may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

We claim:

1. A method of managing a user equipment (UE), comprising:
    determining that a wake-up cycle collision condition exists between a first subscription and a second subscription of the UE when the first subscription and second subscription are camped on a same cell;
    receiving, via a first radio resource of the UE associated with the first subscription, a paging message during a paging block of the cell, wherein a second radio resource of the UE associated with the second subscription is unavailable;
    determining, by the first subscription, that the paging message indicates that a page exists for the second subscription; and
    informing the second subscription that the page exists.

2. The method of claim 1, wherein determining that the paging message indicates that the page exists for the second subscription comprises:
    obtaining an identifier associated with a subscriber identity module (SIM) corresponding to the second subscription; and
    determining that a destination SIM identifier of the paging message corresponds to the identifier associated with the SIM corresponding to the second subscription.

3. The method of claim 2, wherein the identifier comprises at least one of a Temporary Mobile Subscriber Identity and an International Mobile Subscriber Identity.

4. The method of claim 1, wherein informing the second subscription that the page exists comprises informing one or more upper layers of a protocol stack of the UE that the page exists for the second subscription, wherein the upper layers are configured to indicate to one or more lower layers of the protocol stack associated with the second subscription that the page exists for the second subscription.

5. The method of claim 1, further comprising decoding the paging message to obtain information about the page for the second subscription.

6. The method of claim 1, wherein the first subscription and the second subscription are in an idle mode.

7. The method of claim 1, wherein the first subscription is associated with a first SIM of the UE and the second subscription is associated with a second SIM of the UE.

8. A multi-subscriber identity module (SIM) user equipment (UE), comprising:
a wake-up cycle collision condition determining component configured to determine that a wake-up cycle collision condition exists between a first subscription and a second subscription of the UE when the first subscription and second subscription are camped on a same cell;
a first radio resource associated with the first subscription configured to receive a paging message during a paging block of the cell, wherein a second radio resource of the UE associated with the second subscription is unavailable;
a paging message managing component configured to determine, by the first subscription, that the paging message indicates that a page exists for the second subscription and configured to inform the second subscription that the page exists.

9. The multi-SIM UE of claim 8, wherein the paging message managing component further comprises:
an identifier obtaining component configured to obtain an identifier associated with a subscriber identity module (SIM) corresponding to the second subscription; and
a paging message reading component determine that a destination SIM identifier of the paging message corresponds to the identifier associated with the SIM corresponding to the second subscription.

10. The multi-SIM UE of claim 9, wherein the identifier comprises at least one of a Temporary Mobile Subscriber Identity and an International Mobile Subscriber Identity.

11. The multi-SIM UE of claim 8, wherein the paging message managing component further comprises a protocol stack interfacing component configured to inform one or more upper layers of a protocol stack of the UE that the page exists for the second subscription, wherein the upper layers are configured to indicate to one or more lower layers of the protocol stack associated with the second subscription that the page exists for the second subscription.

12. The multi-SIM UE of claim 8, wherein the first radio resource is configured to receive the page and wherein the paging message managing component further comprises a paging message decoding component configured to decode the page to obtain information about the page for the second subscription.

13. The multi-SIM UE of claim 8, wherein the first subscription and the second subscription are in an idle mode.

14. The multi-SIM UE of claim 8, wherein the first subscription is associated with a first SIM of the UE and the second subscription is associated with a second SIM of the UE.

15. An apparatus for mobile communication, comprising:
means for determining that a wake-up cycle collision condition exists between a first subscription and a second subscription of the UE when the first subscription and second subscription are camped on a same cell;
means for receiving, via a first radio resource of the UE associated with the first subscription, a paging message during a paging block of the cell, wherein a second radio resource of the UE associated with the second subscription is unavailable;
means for determining, by the first subscription, that the paging message indicates that a page exists for the second subscription; and
means for informing the second subscription that the page exists.

16. The apparatus of claim 15, wherein the means for determining that the paging message indicates that the page exists for the second subscription comprises:
means for obtaining an identifier associated with a subscriber identity module (SIM) corresponding to the second subscription; and
means for determining that a destination SIM identifier of the paging message corresponds to the identifier associated with the SIM corresponding to the second subscription.

17. The apparatus of claim 16, wherein the identifier comprises at least one of a Temporary Mobile Subscriber Identity and an International Mobile Subscriber Identity.

18. The apparatus of claim 15, wherein the means for informing the second subscription that the page exists comprises means for informing one or more upper layers of a protocol stack of the UE that the page exists for the second subscription, wherein the upper layers are configured to indicate to one or more lower layers of the protocol stack associated with the second subscription that the page exists for the second subscription.

19. The apparatus of claim 15, further comprising means for decoding the paging message to obtain information about the page for the second subscription.

20. The apparatus of claim 15, wherein the first subscription and the second subscription are in an idle mode.

21. The apparatus of claim 15, wherein the first subscription is associated with a first SIM of the UE and the second subscription is associated with a second SIM of the UE.

22. A non-transitory computer-readable medium comprising instructions, that when executed by a processor of a multi-subscriber identity module (SIM) user equipment (UE), cause the UE to:
determine that a wake-up cycle collision condition exists between a first subscription and a second subscription of the UE when the first subscription and second subscription are camped on a same cell;
receive, via a first radio resource of the UE associated with the first subscription, a paging message during a paging block of the cell, wherein a second radio resource of the UE associated with the second subscription is unavailable;
determine, by the first subscription, that the paging message indicates that a page exists for the second subscription; and
inform the second subscription that the page exists.

23. The computer-readable medium of claim 22, further comprising instructions, that when executed by the processor of the multi-SIM UE, cause the UE to:
obtain an identifier associated with a SIM corresponding to the second subscription; and determine that a destination SIM identifier of the paging message corresponds to the identifier associated with the SIM corresponding to the second subscription.

24. The computer-readable medium of claim 23, wherein the identifier comprises at least one of a Temporary Mobile Subscriber Identity and an International Mobile Subscriber Identity.

25. The computer-readable medium of claim 22, further comprising instructions, that when executed by the processor of the multi-SIM UE, cause the UE to inform one or more upper layers of a protocol stack of the UE that the page exists for the second subscription, wherein the upper layers are configured to indicate to one or more lower layers of the protocol stack associated with the second subscription that the page exists for the second subscription.

26. The computer-readable medium of claim 22, further comprising instructions, that when executed by the processor of the multi-SIM UE, cause the UE to decode the paging message to obtain information about the page for the second subscription.

27. The computer-readable medium of claim 22, wherein the first subscription and the second subscription are in an idle mode.

28. The computer-readable medium of claim 22, wherein the first subscription is associated with a first SIM of the UE and the second subscription is associated with a second SIM of the UE.

* * * * *